Feb. 21, 1950   H. T. LINSMEIER   2,497,949
EGG CLEANING MACHINE
Filed June 29, 1949   3 Sheets-Sheet 1
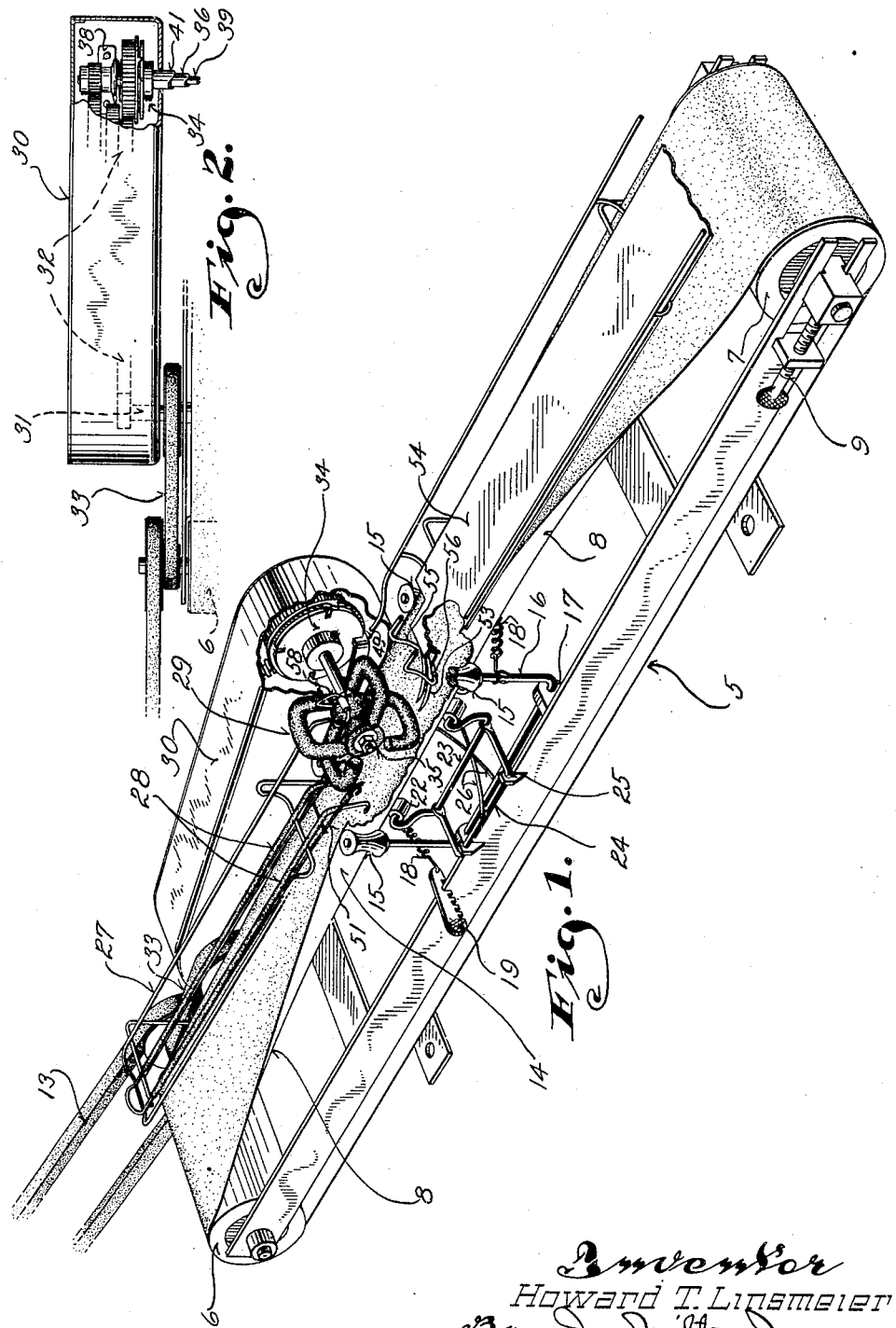
Inventor
Howard T. Linsmeier
By Ira Milton Jones
Attorney

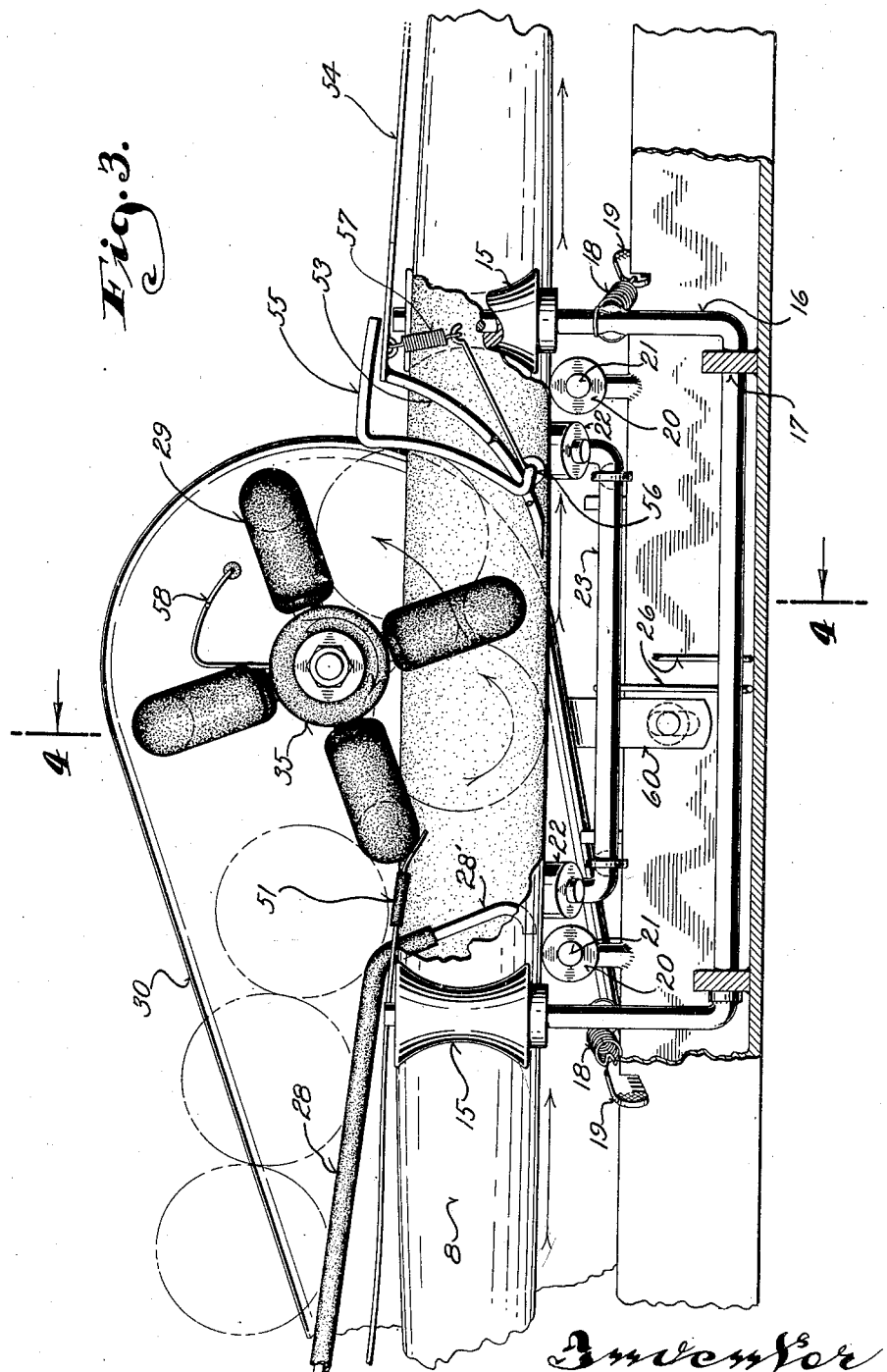

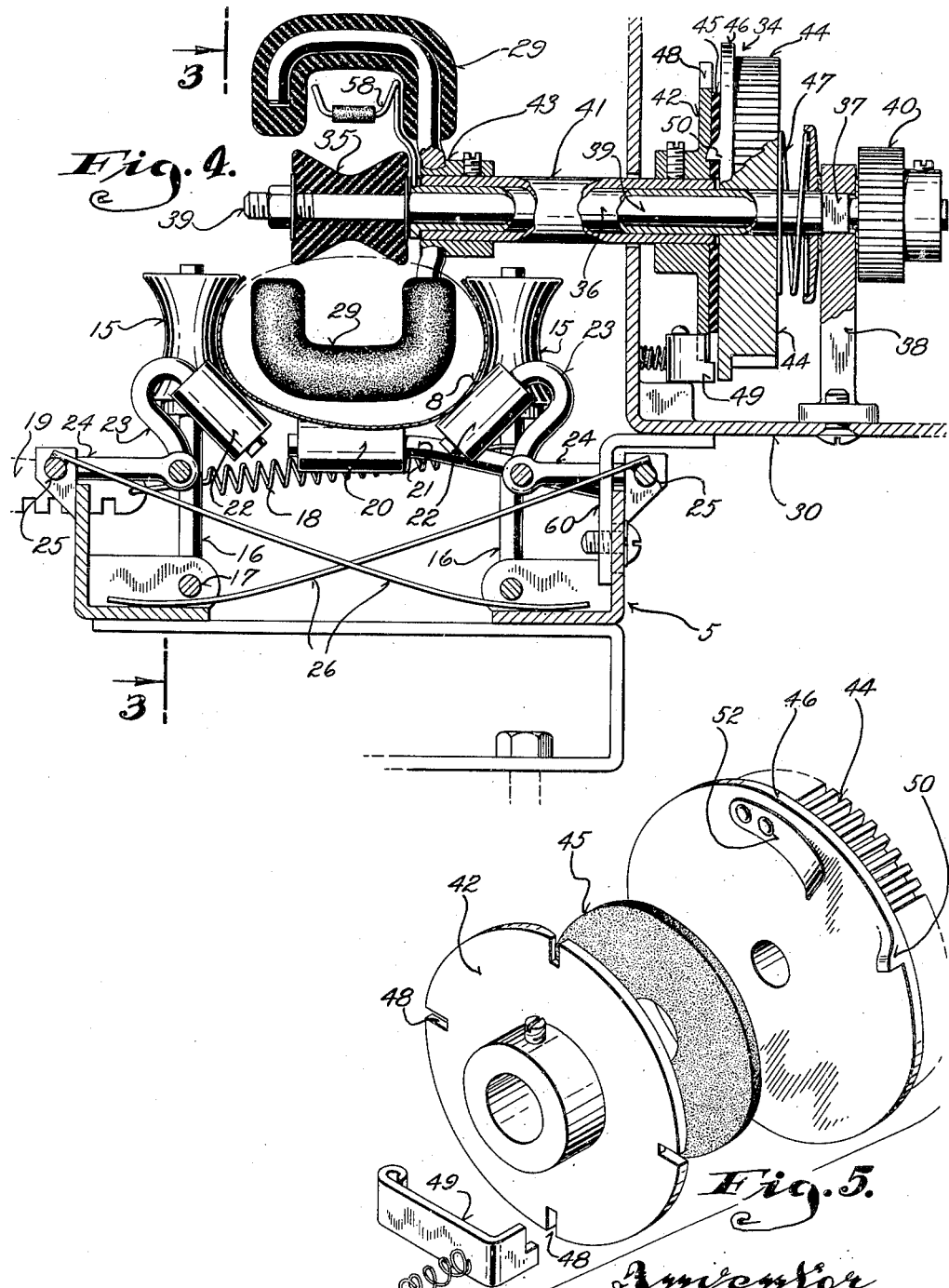

Patented Feb. 21, 1950

2,497,949

UNITED STATES PATENT OFFICE 2,497,949

EGG CLEANING MACHINE

Howard T. Linsmeier, Saukville, Wis.

Application June 29, 1949, Serial No. 102,067

12 Claims. (Cl. 51—137)

This invention relates to certain new and useful improvements in egg cleaning machines and contemplates the provision of a machine which will quickly and safely clean eggs without danger of washing the protective film from the pores thereof, and is a continuation in part of my pending application, Serial No. 761,214, filed July 16, 1947, now abandoned.

Though it is obvious that an egg that has been cleaned possesses no more nutritional value than one in its natural state just as it is laid by the hen, it is a fact that cleaned eggs demand a substantially higher price than uncleaned eggs. Consequently, all farmers who have eggs for sale, if at all possible, clean the eggs before shipping them to market. In view of the nature of this work, it has generally fallen to the lot of the farmer's wife who usually wipes the eggs with a damp cloth. Not only is this a tedious task, but it also has the disadvantage of dissolving and wiping off some of the natural protective film from the egg shell. This disadvantage has been recognized in the past and others heretofore have devised machines which cleaned the eggs without wetting them. Some of these past dry egg cleaning machines consisted essentially of a rotor having strips or loops of flexible abrasive material mounted thereon and extending radially therefrom to have cleaning engagement with an egg manually or mechanically held in a position to have these strips or loops swipe across the egg. The patent to Miller et al. No. 1,964,295, dated June 26, 1934, illustrates one such machine. Patent No. 2,276,581, issued to Curtis B. Jordan March 17, 1942, illustrates another form of dry egg cleaning machine.

All prior art egg cleaning machines, however, have been complicated and expensive or difficult to use.

It is, therefore, an object of my invention to provide a machine for cleaning eggs which is of simple design and construction so that it can be sold at a price well within the means of the ordinary farmer, and which effects the cleaning action in a manner which, instead of flushing the protective film from the pores of the shell, serves to more firmly lodge this film in the pores.

As in the aforesaid Jordan patent the machine of this invention also employs a driven endless abrasive belt having one stretch or lap thereof flexed transversely into a trough with the abrasive on the inside of the trough, and means for individually presenting each egg to and holding it crosswise in the trough. Likewise, as in the Jordan patent the machine of the present invention rotates the egg to assure that all portions of the egg will be contacted by the abrasive belt. However, wherein the past egg cleaning machines the mechanism for feeding the eggs into position and rotating them has been complicated and costly, the present invention provides a simple, inexpensive device for feeding the eggs one at a time into position to be cleaned and another simple device for effecting controlled rotation of the egg so fed and held in cleaning position.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a perspective view of an egg cleaning machine embodying this invention, parts thereof being broken away and in section to show structural details;

Figure 2 is a plan view of part of the drive transmission for the working parts of the machine;

Figure 3 is an enlarged side view of the middle portion of the machine with parts broken away and in section;

Figure 4 is a cross-sectional view taken through Figure 3 on the plane of the line 4—4; and Figure 5 is an exploded perspective view of a clutch mechanism which forms part of the drive for the egg feeding device.

Referring now particularly to the accompanying drawings in which like numerals indicate like parts throughout the several views, the numeral 5 designates generally the frame of the machine which comprises side rails connected at spaced intervals. Pulleys 6 and 7 are rotatably mounted in the opposite ends of the frame and an endless abrasive belt 8 is trained about these pulleys, the tension on the belt being adjusted by tension screws 9.

The abrasive belt 8 may be sand paper, emery cloth, or any other suitable form of flexible abrasive carrier. It is driven at relatively high speed, preferably by an electrical motor, not shown, connected to the driven pulley 6 by a belt 13.

One stretch 14 of the abrasive belt is guided and transversely flexed into a trough-shaped formation of a size to snugly receive an egg held transversely thereof. The means for guiding and shaping this stretch of the belt into the desired troughed formation comprises a plurality of guide rollers or spools 15 engaging the opposite side edge portions of the belt and freely rotatably mounted on the upper ends of the U-shaped carrier frames 16. The closed lower ends of these frames are hingedly mounted as at 17 and tension springs 18 act upon the frames to draw them inwardly toward each other.

To enable the tension of the springs 18 to be adjusted their anchored ends are connected to plural notched hooks 19 engageable over the edges of the side rails of the frame 5, the selection of the notch determining the spring tension.

The spools 15 have concave surfaces of such configuration as to cause the marginal edges of the belt to be turned in to embrace the ends of an egg as clearly shown in Figure 4.

Cooperating with the spools 15 and located slightly inwardly thereof are two horizontal rollers 20 upon which the bottom of the troughed stretch of the belt rides. The axles 21 upon which the rollers 20 are mounted are fixed so as to support the belt in its proper elevation at opposite ends of the working zone.

The guidance of the belt into its troughed formation is completed by two sets of diagonally disposed rollers 22 which, as clearly shown in Figure 4, support the "corners" of the trough between its bottom and sides. These rollers 22 are journaled on the ends of U-shaped carrier frames 23 which in turn are pivotly mounted in other U-shaped carriers 24. The closed ends of the latter carriers are hinged to the side rails of the frame as at 25, and leaf springs 26 fixed to the closed ends of the carriers 24 and bearing on the opposite side rails of the frame urge the rollers 22 inward against the "corner" portions of the troughed stretch of the belt.

The eggs to be cleaned are placed transversely upon a receiving rack 27 which overlies the top stretch of the abrasive belt with its discharge end terminating at the working zone defined by the troughed portion of the belt. This receiving rack may be of any suitable construction and in the present case includes two track-forming rails 28 inclined toward the working zone. These track-forming rails are preferably covered with rubber or some other suitable cushioning material to guard against egg breakage.

As the eggs reach the discharge end of the track 28, they are successively fed or lowered into and held in the troughed portion of the abrasive belt by a feeding reel 29. The feeding reel 29 is carried by the outer free end of an arm 30 mounted to swing about the axis of a jack shaft 31. Thus the feeding reel may be raised and lowered from and back into its operative position. The arm, in the present case, comprises a housing which encloses a train of gears 32 all driven from the jack shaft 31 which in turn is driven from the shaft of the pulley 6 by a belt 33.

By means of the gear-train 32 and a friction clutch indicated generally by the numeral 34, quarter turns are intermittently given the feeding reel 29, while continuous rotation is imparted to a roller 35 disposed centrally of the feeding reel.

As best shown in Figure 4, the mounting of the feeding reel and roller 35 on the free end of the arm 30 also embodies the driving connection between the gear train and the reel and spool. For this purpose a stationary bearing tube 36 is rigidly and non-rotatably mounted as at 37 in a pedestal 38 secured to the arm 30. Within this bearing tube is a rotatable shaft 39, one end of which has the roller 35 fixed thereto. The opposite end of the shaft 39 protrudes beyond the pedestal 38 and has a pinion 40 fixed thereto. This pinion meshes with one of the gears of the gear-train 32 to be continuously driven thereby so as to continuously rotate the roller 35.

Surrounding the tube 36 is a tubular shaft 41 to one end of which the driven element 42 of the clutch 34 is secured. The other end of the tubular shaft 41 has a hub 43 fixed thereon, and extending radially from this hub are the arms of the spider-like feeding reel 29. These arms are preferably U-shaped and are heavily coated with rubber or like cushioning material to afford protection for the eggs.

The roller 35 is likewise formed of rubber, or at least the surface thereof is rubber, so as to have cushioned frictional engagement with the eggs and at the same time provide a frictional driving surface, as the purpose of the roller 35 is to control rotation of the eggs by and while in engagement with the abrasive belt. The directions of rotation of the roller 35 and the feeding reel with respect to the direction of belt travel are indicated by arrows in Figure 3, and as will be readily apparent in the absence of the braking effect exerted upon the eggs by the roller 35, the eggs would be spun so rapidly by the abrasive belt as to have substantially the same surface speed as the belt which, of course, would be undesirable since in this case there would be little or none of the relative movement between the egg and the belt necessary for abrasive action.

The friction clutch 34, in addition to the driven element 42 which is essentially a flange, comprises a driving element 44 and a friction disk 45. The driving element 44 is a gear meshing with one of the gears of the gear-train 32 and provided with a flange 46. The friction disk 45 is interposed between the flat face of the driven element 42 and the flange 46, these parts being held in frictional engagement by a spring 47 confined between the gear 44 and the pedestal 38. Thus the friction clutch at all times tends to rotate the reel 29. However, inasmuch as it is desired to have intermittent rotation of the reel, the driven element 42 of the friction clutch has four notches 48 in its periphery into which a dog 49 engages to hold the driven element, and consequently the reel against rotation during the time the driving element 44 makes a three-quarter turn.

The dog 49 is spring urged into operative engagement with the driven element 42 so as to snap into each notch 48 as it aligns therewith, and is adapted to be disengaged from the notches 48 by a cam 50 on the flange 46. As the gear 44 (the driving element of the friction clutch) is slowly rotated by the gear-train, its cam 50 riding under the dog 49 disengages the same from the notch 48 in which it is then located, thus freeing the driven element of the friction clutch to revolve with the driving element and thereby imparting a quarter turn to the reel.

Re-engagement of the dog 49 in the next notch 48 determines the extent of the rotary movement of the feeding reel. Each quarter turn of the reel lowers an egg from the discharge end of the track 28 down into the working zone where it is held conjointly by the arms of the reel, the roller 35 and the troughed shape of the abrasive belt.

To assure smooth transfer of the eggs from the track 28 down into the working zone, the feeding rack has a pair of spring fingers 51 projecting into the path of the arms of the reel to resiliently support the eggs in coaction with the arms of the reel. The parts are so adjusted that the eggs more or less roll down the inclined ends 28' of the feeding rack as the spring fingers 51 are flexed downward by the arms of the reel. The eggs are thus gently lowered into the trough of the belt and come to rest in a position interposed between the roller 35 and the bottom of the trough with the abrasive belt under tension and yieldingly conformed to the egg between the belt and the roller.

Inasmuch as the roller 35 rotates continuously and oppositely to the abrasive belt with a surface speed much slower than that of the belt, the frictional grip with which the roller engages the egg controls the rotation which the belt tends to impart to the egg while it is held in contact with its abrasive surface and restricts such rotation to a peripheral speed much slower than that of the belt, thereby establishing cleaning contact between all portions of the egg and the belt. The roller 35 is, therefore, essentially a rotation controlling member by which rotation of the egg at the speed necessary to bring all portions of its surface into contact with the cleaning belt is assured.

In view of the fact that the belt travels in the direction in which the feeding reel intermittently revolves, it is desirable to provide means for assuring against having the feeding reel revolve ahead of the driving element of the friction clutch. If the reel were free to advance independently of the driving element, the motion of the reel might very well be so fast as to create danger of egg breakage.

To assure against this possibility the driving element of the friction clutch has a leaf spring 52 mounted on its flange 46 to engage successively in the notches 48. The unidirectional torque transmitting connection between the driving and driven elements of the friction clutch allows the driving element to overrun the driven element but assures that the two will turn in unison during the indexing of the feeding reel. Also as will be readily apparent, since the arms of the reel 29 is rotating around the roller 35 pass through the space between the roller and the bottom of the belt and while in said space travel in the same direction as the belt, the arms of the reel and the friction surface of the belt coact to interpose the eggs between the roller and the belt.

After the eggs are cleaned, they are lifted out of the trough through the conjoint action of the feeding reel, guide fingers 53 projecting down from the adjacent end of a delivery table 54 and two cooperating yielding arms 55 pivoted as at 56 to the lower ends of the fingers 53. A spring 57 yieldingly urges the arms 55 away from the stationary fingers 53 to cushion the contact of the eggs therewith and thus effect a gentle lifting of the eggs onto the delivery table.

To assure that the eggs will roll down onto the delivery table a resilient finger 58 is mounted on the stationary bearing tube 36 in a position to eject the eggs from the pockets in the feeding reel. From the delivery table 53 the eggs may be fed into any suitable receptacle.

Attention is directed to the fact that the mounting of the feeding reel 29 and the friction roller 35 upon the pivoted arm 30, allows the same to be lifted clear of the working zone whenever access thereto is desirable. This manner of mounting the friction roller and the feeding reel also yieldingly biases these elements towards the belt, the biasing force being the weight of the arm and the parts mounted thereon; and this yielding bias upon the friction roller assures that an egg interposed between it and the belt will be yieldingly though firmly held against the inside and bottom of the trough. The pivoted mounting of the arm 30 also has the advantage of guarding against egg breakage in the event an egg accidentally becomes lodged between an arm of the reel and the bottom of the troughed belt. Under such circumstances, the freedom of the arm 30 diminishes the pressure on the egg sufficiently to preclude breakage. The normal operative position of the friction roller and the reel 29 is defined by a stop 60 upon which the free end of the arm 30 rests (see Figure 4).

From the foregoing description, taken in connection with the accompanying drawings, it will be readily apparent to those skilled in the art that this invention provides a satisfactory machine for quickly and efficiently cleaning eggs in a manner which does not involve washing off the protective film, and that the machine of this invention can be constructed at a cost low enough to bring it well within the means of the average farmer.

What I claim as my invention is:

1. In an egg cleaning machine: an endless cleaning element adapted to remove extraneous matter from an egg upon relative motion between the egg and said cleaning element; two sets of guide means one set at each end of a defined portion of the path of travel of said element, and each set comprising means on opposite sides of said cleaning element for yieldingly urging the same into a substantially trough-like formation of a size to snugly receive an egg with its major axis transverse to the trough; a roller having a friction surface; means rotatably mounting said roller across the open face of the trough defined by the cleaning element intermediate said sets of guide means and with the axis of the roller transverse to the trough and its friction surface so spaced with respect to the trough as to accommodate an egg between the roller and the bottom of the trough; a plurality of arms radial to and encircling said roller to define pockets each of a size to hold an egg; means for rotating the roller; and means for intermittently rotating the connected radial arms to successively interpose eggs between the roller and the bottom of the trough.

2. The structure set forth in claim 1 further characterized by the provision of: an inclined track leading to the pockets between the radial arms for presenting eggs to empty pockets as they are aligned with said track.

3. The structure set forth in claim 2, further characterized by the provision of: yielding egg supporting means at the discharge end of said inclined track positioned to coact with the radial arms in supporting the eggs as they are moved from the track into the trough defined by the cleaning element.

4. In an egg cleaning machine: a flexible cleaning belt mounted for endwise movement along a defined path; means for so moving the belt; guide means acting upon the belt to flex the same transversely and to shape a portion of the belt into a trough of a size to snugly receive an egg, with its major axis crosswise of the belt; a friction roller; means rotatably mounting the friction roller crosswise of the trough and spaced from the bottom of the trough a distance to hold an egg interposed between the roller and the cleaning belt against the bottom of the trough; means for driving the roller to control rotation of an egg confined between the roller and the bottom of the trough; angularly spaced egg feeding and holding members rotatable around and with respect to the roller to feed eggs into the space between the roller and the bottom of the trough and to hold them in said position for rotation under control of the roller; and means for imparting stepwise rotation to said egg feeding and holding members, 5. In an egg cleaning machine; a flexible cleaning member mounted for movement through a work zone; means for imparting unidirectional movement to the cleaning member through the work zone; guide means acting upon the flexible cleaning member to shape the same into a trough as it travels through the work zone with the trough of a size to receive an egg therein, said guide means leaving the portion of the cleaning member in the work zone free to yieldingly conform itself to an egg held in the trough; a friction roller rotatably mounted in the work zone crosswise of the troughed cleaning member and spaced from the bottom of the trough a distance to hold an egg interposed between the roller and the cleaning member against the bottom of the trough; egg feeding and holding means constrained to movement along a defined path fixed with respect to the roller and passing through the space between the roller and the bottom of the trough; means for intermittently moving said feeding and holding means along said path in the direction of travel of the cleaning member so that the cleaning member and the feeding and holding means coact to interpose an egg between the roller and the cleaning member, the feeding and holding means coming to rest with the egg gripped between the friction roller and the cleaning member; and means for rotating the friction roller at a surface speed less than that of the cleaning member so that the egg rotating at a speed controlled by the friction roller has all portions thereof brought into engagement with the cleaning member.

6. In an egg cleaning machine: a flexible cleaning belt movable endwise through a work zone; means for so moving the cleaning belt; guide means acting upon the cleaning belt to shape the portion thereof in the work zone into a trough of a size to receive an egg with its major axis crosswise of the cleaning belt, said guide means leaving the troughed portion of the belt free to yieldingly conform to an egg held in the trough; a rotatable friction roller; means mounting the roller in the work zone crosswise of the belt but movable toward and from the belt, said friction roller being yieldingly biased toward the belt so that an egg positioned between the roller and the belt will be held firmly through yieldingly against the inside and bottom of the trough; egg feeding and holding means constrained to movement along a defined path fixed with respect to the roller and passing through the space between the roller and the bottom of the trough for feeding eggs into said space and holding them in position to be acted upon by the friction roller; means for driving the friction roller with its egg engaging friction surface travelling at a speed different from that of the cleaning belt so that an egg interposed therebetween will be revolved; and means for driving said egg feeding and holding means along its defined path of movement.

7. In an egg cleaning machine, the combination set forth in claim 6 further characterized by the fact that said egg feeding and holding means comprises a reel rotatable about and with respect to the roller and having radially extending arms which cooperate with each other to provide egg receiving pockets.

8. In an egg cleaning machine, the combination set forth in claim 7 further characterized by the provision of means for imparting stepwise rotation to the reel with each step of a length such that an egg is sequentially fed into the trough, held there while the roller revolves it and the belt cleans it, and then discharged from the trough.

9. In an egg cleaning machine: a flexible cleaning belt movable endwise through a work zone; means for so moving the cleaning belt; guide means acting upon the cleaning belt to shape the portion thereof in the work zone into a trough of a size to receive an egg with its major axis crosswise of the cleaning belt, said guide means leaving the troughed portion of the belt free to yieldingly conform to an egg held in the trough; a rotation controlling member having a friction surface adapted to resist relative motion between it and the surface of an egg in engagement therewith; means mounting said member above the bottom of the troughed portion of the belt, said member and the troughed portion of the belt being biased toward each other so that an egg positioned between said member and the belt will be held firmly though yieldingly against the inside and bottom of the trough; movable egg feeding and holding means constrained to movement along a defined path parallel to the belt and fixed with respect to the rotation controlling member and passing through the space between said member and the bottom of the trough for feeding eggs into said space and holding them in position to be acted upon by the cleaning belt while under control of said rotation controlling member; and means for driving said egg feeding and holding means along its defined path of movement.

10. In an egg cleaning machine: an endless flexible abrasive cleaning belt trained about spaced pulleys; means for driving said belt to carry one lap thereof in one direction through a work zone; guide means acting upon said lap of the belt to flex the portion thereof in the work zone into a trough of a size to receive an egg, said guide means leaving the troughed portion of the belt free to yieldingly conform to an egg held in the trough; an egg engaging friction member facing the open side of the trough and spaced from the bottom thereof and adapted to engage an egg in the trough to restrain free rotation of the egg by the belt; egg feeding and holding means constrained to movement along a defined path fixed with respect to the egg engaging friction member and passing through the space between said member and the bottom of the trough; means for moving the feeding and holding means along its defined path and in the direction of travel of the belt through the work zone, so that said means and the belt coact in feeding an egg into the trough and against the egg engaging friction member; means coacting with the feeding and holding means for discharging an egg after being cleaned; a supporting structure upon which said egg engaging friction member and the feeding and holding means are mounted; and means mounting the supporting structure for movement toward and from the troughed portion of the belt whereby said egg engaging friction member and the feeding and holding means may be readily moved away from the belt to facilitate replacement of the belt, and said supporting structure being biased toward the belt when in its operative position to yieldingly hold the egg engaging friction member against an egg positioned between it and the belt.

11. In an egg cleaning machine, the combination of: an endless abrasive cleaning belt trained about horizontally spaced pulleys; spaced belt shaping means acting upon spaced portions of the top lap of the belt to flex the same transversely into an open topped trough, the space between said belt shaping means constituting a work zone and the portion of the belt disposed in said work zone being free to yieldingly conform itself to an egg placed therein; an inclined track positioned above said lap of the belt and leading toward the work zone, down which eggs to be cleaned may roll; guide means leading from the discharge end of the track and down which the eggs may roll into the trough of the belt; a rotatable reel having angularly spaced radial arms providing pockets for the reception of eggs; means rotatably mounting said reel in the work zone above the troughed portion of the belt with its arms movable along the guide means to control the movement of the eggs along the guide means and gently lower the eggs into the trough of the belt; means for effecting stepwise rotation to said reel with each step of a length sufficient to lower an egg from the inclined track down into the troughed cleaning belt, and with the intervals between the steps of sufficient duration to allow cleaning of an egg so placed; a rotatable friction roller at the hub of the reel engageable with an egg so placed to control rotation of the egg; and means for rotating the friction roller independently of the reel and at a speed to effect relative movement between the cleaning belt and the surface of the egg.

12. In an egg cleaning machine, the combination set forth in claim 11 further characterized by the fact that the reel is mounted on a hollow shaft which contains the shaft of the friction roller; and the provision of means for continuously driving the shaft of the roller; and ratchet controlled means for intermittently imparting stepwise rotary motion to the hollow shaft of the reel.

HOWARD T. LINSMEIER.

No references cited.